United States Patent [19]

Campbell

[11] Patent Number: 4,730,399

[45] Date of Patent: Mar. 15, 1988

[54] WHEEL BOLT CIRCLE GAUGE

[76] Inventor: Russ Campbell, 5290 St. Helena Hwy., Napa, Calif. 94558

[21] Appl. No.: 23,143

[22] Filed: Mar. 9, 1987

[51] Int. Cl.⁴ .............................................. G01B 5/00
[52] U.S. Cl. ................................... 33/143 M; 33/600
[58] Field of Search ............. 33/143 R, 143 M, 143 J, 33/143 K, 158, 147 R, 600

[56] References Cited

U.S. PATENT DOCUMENTS

| | | | |
|---|---|---|---|
| 2,537,473 | 1/1951 | McCusker | 33/158 |
| 2,693,033 | 11/1954 | Acker | 33/143 M X |
| 3,289,307 | 12/1966 | Kelly | 33/143 M |
| 3,845,559 | 11/1974 | Offer | 33/143 M |

FOREIGN PATENT DOCUMENTS 2030765 12/1971 Fed. Rep. of Germany ... 33/143 M

Primary Examiner—Harry N. Haroian
Attorney, Agent, or Firm—Bruce & McCoy

[57] ABSTRACT

An automobile wheel bolt circle gauge which includes a pair of movable projections which can be inserted into adjacent bolt holes to measure the distance therebetween and register the distance on indicia inscribed on the gauge which can be interpreted to determine the maker of the wheel or the automobile on which it might fit.

6 Claims, 7 Drawing Figures

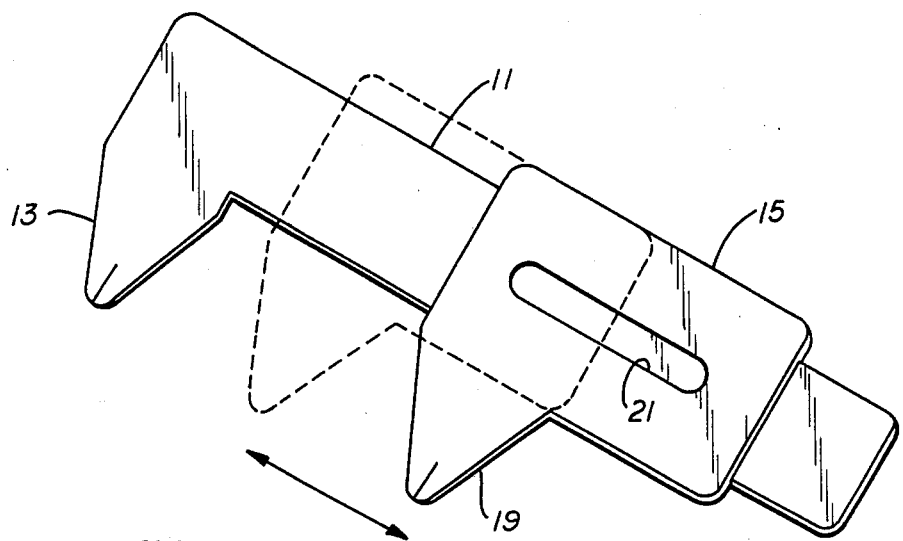
FIG._1.
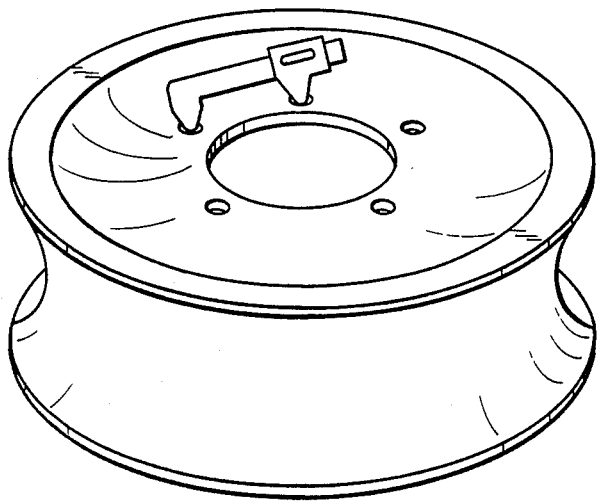
FIG._2.
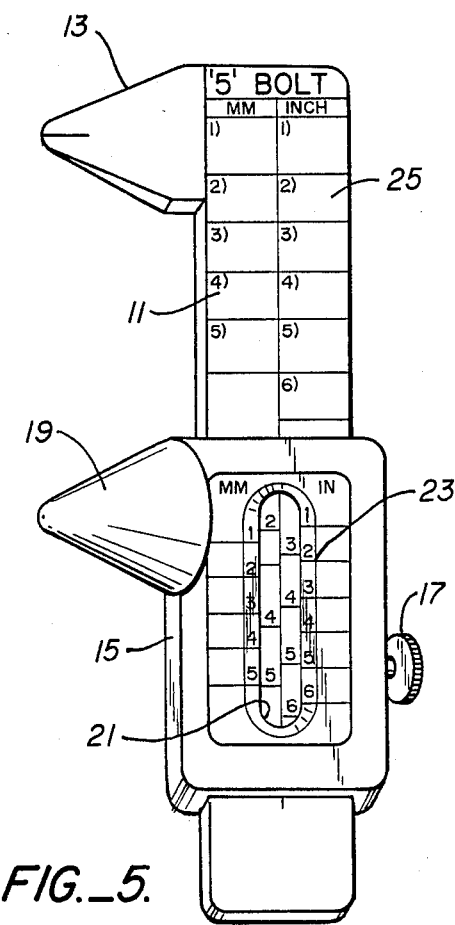
FIG._5.

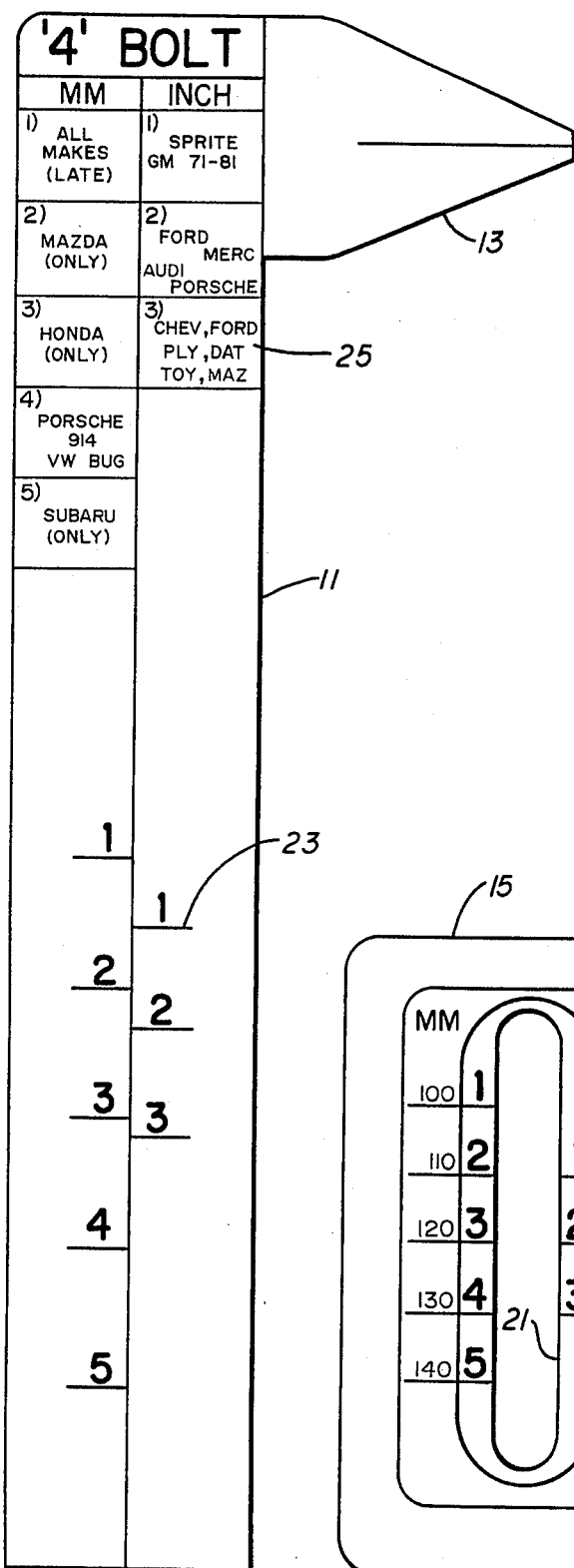
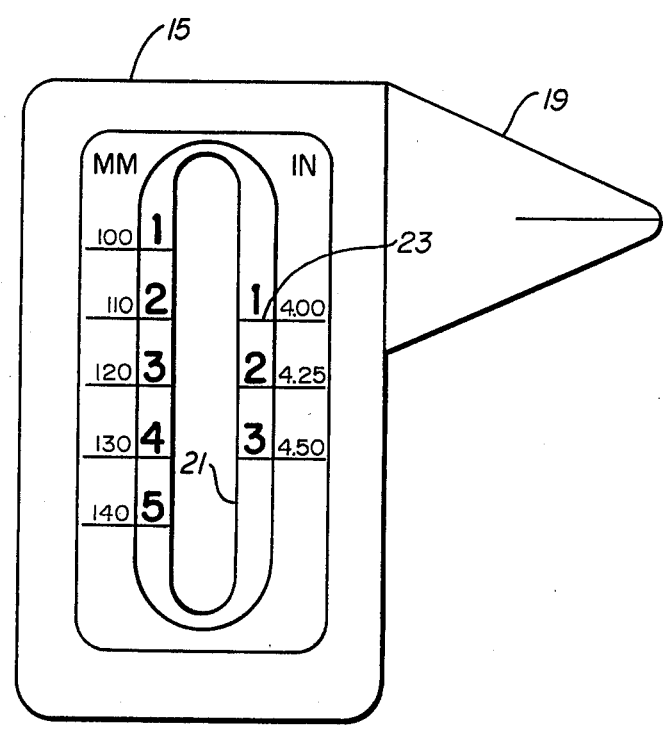
FIG._3.   FIG._4.

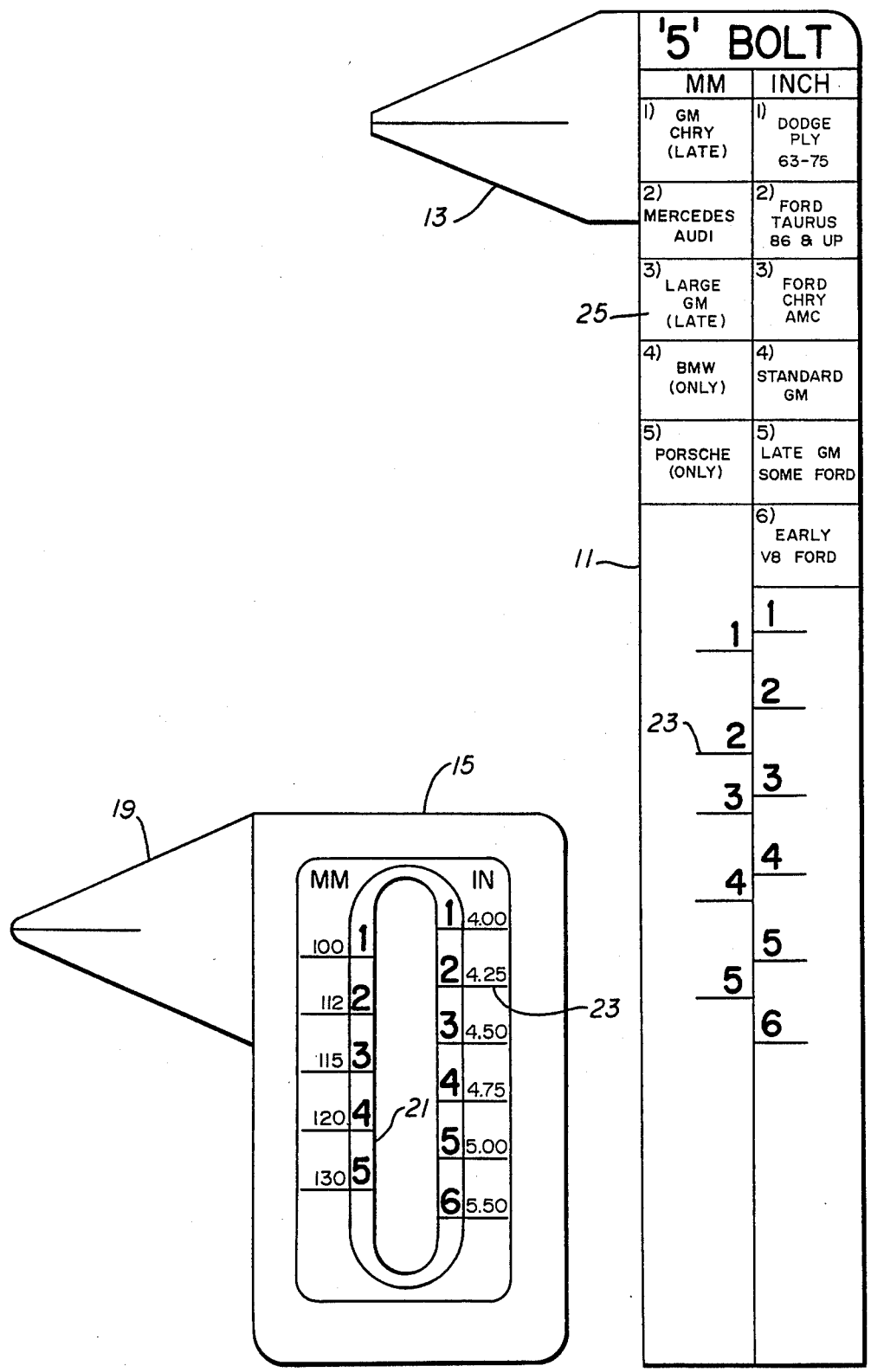
FIG._4A.   FIG._3A.

WHEEL BOLT CIRCLE GAUGE

BACKGROUND OF THE INVENTION

1. Field of the Invention

The present invention relates to gauges and more particularly to an automobile wheel bolt circle gauge for determining the possible maker of the wheel or the automobiles on which it might fit from the bolt circle pattern.

2. Description of the Prior Art

Many specific function gauges have been developed for numerous purposes. Specifically, there are a number of machinist gauges which are used to measure inside or outside dimensions of a part. These traditionally have a scale with a pair of projections, one of which is fixed and disposed at one end of the scale and the other of which slides along the scale with respect to the fixed one. The projections are usually formed to measure both an inside and an outside parameter, such as the inside diameter or the outside diameter of a pipe, by sliding the movable indicator on the scale either apart until the projections contact the inside edges of the distance to be measured or sliding them together until they contact the outside dimensions. Indicia on the scale indicates what the distance is between the two slides for either an inside or outside dimension. That structure, modified to suit the particular purpose, is used for the present invention, but the known devices could not make the measurement required or provide an answer to the particular problem that the present invention solves.

Automobile wrecking yards usually salvage all of the usable parts from each automobile that they dismantle. It is usual practice to separate such parts into categories. Thus, for example, engines are located in one place, glass in another, tires in another, transmissions, body parts, rear ends, etc., in other places, piles, or storage bins.

With respect to automobile wheels, once one has been removed or separated from an automobile, it is very difficult to determine what kind of a car it might have come from by inspection. There are many different types of wheel construction, different diameter bolt circle patterns, four lug and five lug bolt hole patterns, and there are many different combinations of these for even the same make car over a period of years and even within the same year model. While the wheels are readily distinguishable from each other, determining the automobiles on which they might fit is not.

However, by measuring the distance between adjacent bolt holes, that determination can be made but it requires integrating a lot of information. In addition, making that measurement is very difficult because the center of the holes is difficult to locate and the difference in the distances on the different types of wheels is minute. thus, these measurements must be made accurately and there must be a means by which the distance can be interpreted to identify the car from which the wheel might have come or on which it might fit. The prior art gauges cannot measure the distance between the center of holes and they do not have the integrated indicia necessary to indicate on what automobiles the wheels might fit.

Applicant has developed a device for accurately determining the distance between the centers of adjacent automobile wheel bolt holes and provides a unique indicia system for immediately identifying the various types of automobiles on which a wheel might fit based on simply the determined distance between the bolt holes without knowing in terms of measurement what that distance is. No other known device achieves these results.

SUMMARY OF THE INVENTION

The present invention is a wheel bolt circle gauge which comprises an elongated scale having a first tapered projection which extends from proximate one end thereof perpendicular to the longitudinal axis of the scale. The scale is provided with a movable indicator which is mounted to slide on the scale. The indicator has a second tapered projection which is mounted thereon which also extends perpendicular to the longitudinal axis of the scale. The two tapered projections are formed to engage two adjacent bolt holes of an automobile wheel to accurately register on the indicator and the scale a predetermined distance between the centers of the holes. The gauge is also provided with an interacting graduated indicia which is inscribed on the scale and on the indicator whereby the type of automobile on which the wheel might fit can be deterined from the alignment of marks on the scale and the indicator when the projections of the gauge are inserted into adjacent bolt holes of an automobile wheel.

OBJECTIONS OF THE INVENTION

It is therefore an important object of the present invention to provide an automobile wheel gauge for determining the possible maker of an automobile wheel or the automobiles on which it might fit.

It is another object of the present invention to provide an automobile wheel gauge which can make these determinations for either a four bolt hole or five bolt hole automobile wheel.

It is a further object of the present invention to provide a automobile wheel gauge which includes a table wherein the indicia corresponds to the makes of automobiles the wheels might have come from or on which they might fit.

Other objects of the present invention will become apparent when it is considered in conjunction with the accompanying drawings.

BRIEF DESCRIPTION OF THE DRAWINGS

FIG. 1 is a perspective view of a wheel bolt circle gauge of the present invention in its simplest planar form;

FIG. 2 is a perspective view of an automobile wheel showing a gauge of the present invention engaged with adjacent bolt holes for measuring the distance therebetween to determine the make of car the wheel might have come from or on which it might fit;

FIG. 3 is a side elevation of the scale portion of the present invention showing the indicia inscribed thereon;

FIG. 3A is a side elevation of the opposite side of FIG. 3;

FIG. 4 is a side elevation of the indicator of the present invention showing the indicia inscribed thereon;

FIG. 4A is the opposite side of FIG. 4; and

FIG. 5 is a perspective view of a preferred embodiment of the present invention.

DESCRIPTION OF THE PREFERRED EMBODIMENT

A preferred embodiment of the present invention is ilustrated in FIG. 5. It is an automobile wheel gauge which can determine the possible maker of an automobile wheel or the automobiles on which a wheel might fit from the lug bolt circle pattern. It includes an elongated scale 11 which is in a form similar to an elongated ruler. However, instead of graduated markings like on a ruler, a specific indicia developed to solve the problem of identification of automobile wheels from their bolt pattern is provided.

The elongated scale has a first uniformly tapered projection 13 extending from proximate one end thereof. The projection extends perpendicular to the longitudinal axis of the scale.

A movable indicator 15 is mounted on the scale in such a way as it can slide therealong. It can be provided with a lock which will tighten the indicator on the scale by means of a thumb screw 17 or friction holding device to prevent movement once an accurate reading has been taken or to prevent the indicator from sliding off the end of the scale when it is being stored, transported, or handled between measuring tasks.

The indicator 15 is provided with a second uniformly tapered projection 19 which is mounted on the indicator. It also extends perpendicular to the longitudinal axis of the scale. In the preferred embodiment, this uniformly tapered projection is provided in conical form. Either or both tapered projections can be conical in configuration.

The projections on the scale and indicator are formed to engage two adjacent bolt holes of an automobile wheel (FIG. 2) to accurately register on the indicator and the scale the distance between the holes. The conical projection on the indicator provides a faster, more stabilized measurement. This occurs by seating the conical projection 19 of the indicator and then pushing the scale inward or outward with respect to the indicator to engage the adjacent bolt hole. The conical indicator is accurately seated by very slight swiveling in the hole in which it is placed due to its configuration.

In the preferred embodiment, the indicator has at least one elongated opening formed therein 21. Where the same scale is used for both a four and a five bolt hole pattern, it is most convenient and less confusing to put a pair of openings on opposite sides of the indicators. These elongated openings 21 have their longitudinal axis disposed parallel to the longitudinal axis of the scale.

The scale and indicator are provided with interacting graduating indicia 23 which are inscribed thereon whereby the bolt circle of a wheel can be determined by the alignment of marks on the scale and the indicator. The indicia include numerically or alphabetically numbered marks which are formed on the scale and are arranged to be visible through the elongated openings formed in the indicator. Corresponding marks are also formed on the indicator along the edges of the openings.

When the projections of the gauge are inserted into adjacent lug bolt holes, the distance between them registers on the gauge by the alignment of two marks having corresponding numbers or letters. The alignment of any two marks having the same number indicates a specific distance between the automobile wheel lug bolt holes. These numbers or letters correspond to adjacent bolt hole distances for all of the major makes of automobiles.

The indicia also includes a table 25 wherein the numbers or letters of the numbered marks on the scale and indicator correspond to the makes of automobiles that the wheels might have come from or on which they might fit. See FIGS. 3 and 4.

In the preferred embodiment, the indicia for a four bolt pattern wheel is disposed on one side of the gauge and the indicia for a five bolt pattern is disposed on the other.

In an inexpensive version (see FIG. 1), the scale can be made from thin metal, plastic, or impregnated paper sheets or stamped parts. However, for a more accurate version, which is obviously more expensive to manufacture, the indicator can be provided with a machined conical projection for more accurate seating of the whole gauge in the wheel.

Thus it will be apparent from the foregoing description of the invention in its preferred form that it will fulfill all of the objects attributable thereto, and while it has been illustrated and described in considerable detail, the protection is not to be limited to such details as have been set forth except as may be necessitated by the appended claims.

I claim:

1. A wheel bolt circle gauge for determining what type of automobile on which either a four bolt or five bolt automobile wheel will fit comprising
    an elongated scale having a first uniformly tapered projection extending from proximate one end thereof perpendicular to the longitudinal axis of said scale,
    a movable indicator mounted to slide on said scale and having a second uniformly tapered projection mounted thereon also extending perpendicular to the longitudinal axis of said scale, said tapered projections formed to engage two adjacent lug bolt holes of an automobile wheel to accurately register on said indicator and said scale the distance between the centers of said holes, and
    interacting graduated indicia inscribed on said scale and said indicator whereby the bolt circle pattern of a wheel can be determined for identifying on what automobile a wheel will fit from the alignment of marks on said scale and indicator when the projections of said gauge are inserted in adjacent bolt holes of a wheel, said indicia including graduated numbered marks on said scale and said indicator whereby alignment of any two of said marks having the same number, one each on said scale and said indicator, indicates a specific distance between the holes of said wheel and the identity of the automobile on which said wheel will fit can be determined from the aligned numbers.

2. The wheel gauge of claim 1 wherein the indicia of said gauge are divided into separate scales for four and five bolt automobile wheels.

3. The wheel gauge of claim 2 wherein the indicia of said gauge are further divided into separate scales for metric and standard measurement of the distances between the holes.

4. A wheel bolt circle gauge for determining what type of automobile on which either a four bolt or five bolt automobile wheel will fit comprising
    an elongated scale having a uniformly tapered projection extending from proximate one end thereof perpendicular to the longitudinal axis of said scale, a movable indicator mounted to slide on said scale and having a conical projection disposed thereon proximate the end thereof closest to said tapered projection, said conical projection also extending perpendicular to the longitudinal axis of said scale, said projections formed to engage two adjacent lug bolt holes of an automobile wheel to accurately register on said indicator and said scale the distance between the centers of said holes, said indicator having elongated openings formed therein on opposite sides thereof with the longitudinal axis of said openings disposed parallel the longitudinal axis of said scale, said scale being visible through said openings, and interacting graduated indicia inscribed on said scale and along the edges of the elongated openings formed in said indicator whereby the bolt circle pattern of an automobile wheel can be determined for identifying on what automobile a wheel will fit by the alignment of marks on said scale and indicator when the projections of said gauge are inserted in adjacent lug bolt holes of an automobile wheel, the indicia of said gauge including numbered marks formed on said scale and arranged to be visible through the elongated openings formed in said indicator and corresponding marks formed on said indicator along the edges of said openings, the alignment of any two marks having the same number indicating a specific bolt circle pattern, said indicia also including a table wherein the numbers of the numbered marks on the scale and indicator correspond to the makes of automobiles the wheels might have come from or on which they might fit, the indicia for a four bolt pattern wheel being disposed on one side of the gauge and the indicia for a five bolt pattern being disposed on the other, each of the indicia scales on both sides of the gauge being divided into separate scales for metric and standard measurement of the distances between the holes.

5. A wheel bolt circle gauge for determining what type of automobile on which either a four bolt or five bolt automobile wheel will fit comprising an elongated scale having a first uniformly tapered projection extending from proximate one end thereof perpendicular to the longitudinal axis of said scale, a movable indicator mounted to slide on said scale and having a second uniformly tapered projection mounted thereon also extending perpendicular to the longitudinal axis of said scale, said tapered projections formed to engage two adjacent lug bolt holes of an automobile wheel to accurately register on said indicator and said scale the distance between the centers of said holes, said indicator having elongated openings formed therein on opposite sides thereon with said scale being visible through said openings, and interacting graduated indicia inscribed on said scale and along the edges of the elongated openings formed in said indicator whereby the bolt circle pattern of a wheel can be determined for identifying on what automobile a wheel will fit from the alignment of marks on said scale and indicator when the projections of said gauge are inserted in adjacent bolt holes of an automobile wheel, the indicia of said gauge being divided into separate scales for four bolt and five bolt automobile wheels, said indicia being further divided into separate scales for metric and standard measurement of the distances between the holes.

6. The wheel gauge of claim 5 wherein the indicia includes a table wherein the numbers of the numbered marks on the scale and indicator correspond to the makes of automobiles the wheels might have come from or on which they might fit.

* * * * *